United States Patent [19]

Kubota

[11] Patent Number: 4,825,703
[45] Date of Patent: May 2, 1989

[54] ELECTROMAGNETIC FLOW METER

[75] Inventor: Yousuke Kubota, Tokyo, Japan

[73] Assignee: Kabushiki Kaisha Toshiba, Kawasaki, Japan

[21] Appl. No.: 71,464

[22] Filed: Jul. 9, 1987

[30] Foreign Application Priority Data

Jul. 28, 1986 [JP] Japan ............................ 61-114579[U]

[51] Int. Cl.$^4$ ............................................. G01F 1/58
[52] U.S. Cl. .................................................. 73/861.12
[58] Field of Search ...................................... 73/861.12

[56] References Cited

U.S. PATENT DOCUMENTS 4,253,340  3/1981  Schmoock ....................... 73/861.12
4,454,766  6/1984  Reinhold et al. ................ 73/861.12

FOREIGN PATENT DOCUMENTS 3225226  2/1983  Fed. Rep. of Germany .
3545155  7/1986  Fed. Rep. of Germany .
61-151429  7/1986  Japan .

Primary Examiner—Charles A. Ruehl
Attorney, Agent, or Firm—Foley & Lardner, Schwartz, Jeffery, Schwaab, Mack, Blumenthal & Evans

[57] ABSTRACT

An electromagnetic flow meter interposable between ends of upstream and downstream pipes. The flow meter comprises a measuring pipe of nonmagnetic material for fluid flow therethrough; two magnetic flux generating units facing toward and forming gaps with the outer surface of the measuring pipe; and two casing units of magnetic material enclosing the magnetic flux generating units and the measuring pipe, with the magnetic flux generating units being adjustably secured to the casing units. One of the casing units or the measuring pipe has projections which make the axes of the casing units and the measuring pipe coincide.

8 Claims, 3 Drawing Sheets

ELECTROMAGNETIC FLOW METER

CROSS-REFERENCE TO RELATED APPLICATION

This application is a continuation-in-part of copending patent application Ser. No. 813,136, filed Dec. 24, 1985, U.S. Pat. No. 4,679,442.

BACKGROUND OF THE INVENTION

The present invention relates to an electromagnetic flow meter that can be inserted and clamped between two flanges of piping conveying a fluid that is to be measured. More particularly, the present invention pertains to a structure for such an electromagnetic flow meter.

In constructing a conventional electromagnetic flow meter, a measuring pipe made of a non-magnetic metal is inserted through an opening in the axial end face of an outer casing made of a magnetic metal, and the end portions of the measuring pipe are secured to the outer casing by means of welding. Electrode bosses are inserted through an opening in the outer casing in a direction perpendicular to the axis of the measuring pipe and are welded to the measuring pipe. Insulating spacers then are threaded into the electrode bosses, and an insulating lining is provided on the inner surface of the measuring pipe. Then, electrodes are inserted into the insulating spacers from the inner surface of the measuring pipe and are secured. Thereafter, a pair of magnet cores provided with exciting coils are mounted by inserting them from the open ends of upper and lower magnetic flux generating unit housing portions, which are formed on the outer casing so as to extend orthogonally to the axis of the measuring pipe and to the electrodes.

After assembly, the only way possible to confirm whether or not the structural symmetry required for the electromagnetic flow meter has satisfactorily been obtained is by visually checking the outside of the apparatus. The apparatus, however, is housed in the outer casing, and it is therefore difficult to effect any accurate confirmation. For this reason, it is necessary to increase substantially the degree of machining accuracy to ensure the required symmetry and reduce the distance between the upper and lower magnetic flux generating units, which fact inevitably increases the costs. Moreover, it is difficult to conduct such assembling operations as mounting the constituent elements and handling the lead wires extending from the electrodes and the magnetic flux generating units, which must be carried out in the narrow space within the outer casing. It is therefore not easy to reduce the time required for assembly.

One example of a prior art electromagnetic flow meter that can be inserted and clamped between two flanges of piping conveying fluid to be measured is disclosed in U.S. Pat. No. 4,253,340. In this example, a splittable outer casing and the magnet cores are integral with each other, and coils are mounted on the cores. Accordingly, although the outer casing comprises two splittable portions, and these portions are bonded together during assembly, it is still difficult to confirm the structural symmetry of the flow meter and reduce the distance between the upper and lower magnetic flux generating units, because the magnet cores are applied at the same time as the outer casing, which prevents the assembler from checking the accuracy of the assembly.

An electromagnetic flow meter representing earlier work of the present inventor is disclosed in Japanese Patent Disclosure (Kokai) No. 61-151429. In this example, the splittable outer casing and the magnetic cores are not in contact with each other. Therefore, it is difficult to set the outer casing in proper position in relation to the magnetic cores, the electrodes and the measuring pipe. Since the outer casing position affects the magnetic field in the measuring pipe, it is desired that the outer casing position is easily adjustable and easily confirmed in relation to the measuring pipe. In addition, if the outer casing is made of magnetic metal, and if the magnetic cores are in contact with the outer casing, the intensity of the magnetic field in the measuring pipe increases, which is preferable.

SUMMARY OF THE INVENTION

It is therefore an object of the present invention to provide an improved electromagnetic flow meter. Another object of this invention is to provide a method for accurately and easily positioning the casing and the magnetic flux generating units in relation to the measuring pipe and the electrodes in an electromagnetic flow meter.

Another object of this invention is to provide an electromagnetic flow meter having an enhanced magnetic field in the measuring pipe.

According to one aspect of the invention there is provided an electromagnetic flow meter interposable between ends of upstream and downstream pipes conveying a fluid whose flow rate is to be measured, comprising: a measuring pipe made of non-magnetic material, the fluid flowing through the measuring pipe along the axis of the measuring pipe; a pair of electrodes for picking up electricity generated depending on the flow rate of the fluid in the measuring pipe, the electrodes mounted in the measuring pipe; first and second magnetic flux generating units for generating magnetic flux in the measuring pipe, the flux generating units being arranged facing toward and being separated by gaps from the outer surface of the measuring pipe; a first casing unit enclosing the first magnetic flux generating unit and a first circumferential portion of the measuring pipe, the first magnetic flux generating unit being adjustably secured to the first casing unit; means, including a plurality of spacing members associated with at least one of the measuring pipe and the first casing unit, for positioning the first casing unit in spaced relationship with respect to the measuring pipe; and a second casing unit enclosing the second magnetic flux generating unit and a second circumferential portion of the measuring pipe, the first and second circumferential portions representing the entire circumference of the measuring pipe, the second magnetic flux generating unit being adjustably secured to the second casing unit, and the second casing unit facing toward the measuring pipe and forming a gap therebetween.

According to another aspect of the invention there is provided a method for constructing an electromagnetic flow meter interposable between ends of upstream and downstream pipes conveying fluid whose flow rate is to be measured, comprising the steps of: mounting a pair of magnetic flux generating units temporarily with flexible fastening means on the outer surface of the measuring pipe; subsequently, mounting a plurality of casing units enveloping the side of the measuring pipe with the magnetic flux generating units; and subsequently, securing the magnetic flux generating units to the casing units.

Further objects, features and advantages of the present invention will become apparent from the detailed description of the preferred embodiments that follows, when considered with the accompanying drawings.

BRIEF DESCRIPTION OF THE DRAWINGS

The accompanying drawings, which are incorporated in and constitute a part of this specification, illustrate preferred embodiments of the invention and, together with the description, serve to explain the principles of the invention. In the drawings.

DETAILED DESCRIPTION OF THE PREFERRED EMBODIMENTS

Figure 1:
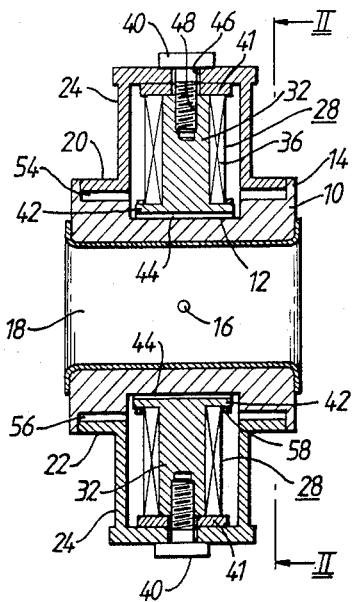
FIG. 1 is a cross-sectional view of an embodiment of the flow meter of the present invention, taken along a vertical plane containing the axis of the measuring pipe.
Figure 2:
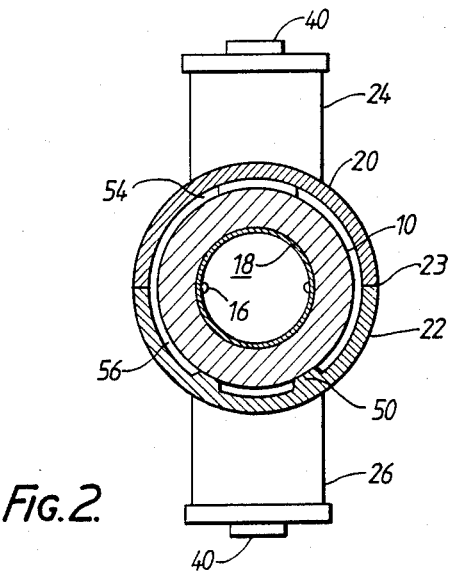
FIG. 2 is a cross-sectional view taken along line II—II of FIG. 1.
Figure 3:
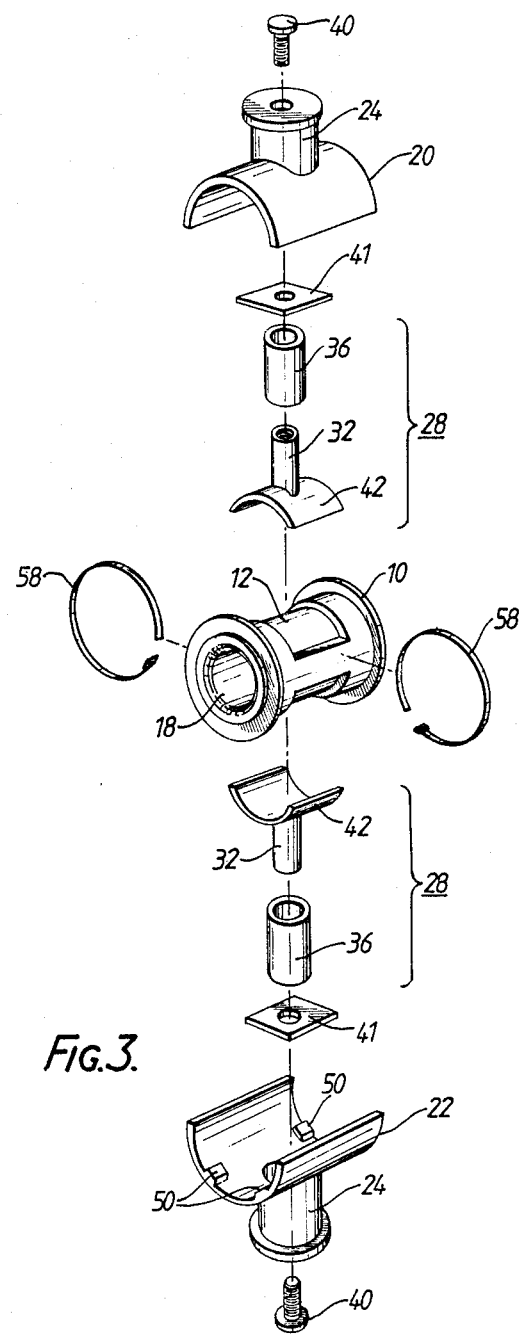
FIG. 3 is an exploded perspective view of the embodiment shown in FIG. 1.

One embodiment of an electromagnetic flow meter of the present invention is shown in FIGS. 1, 2 and 3.

A measuring pipe (10) is made of a non-magnetic metal, for example, stainless steel. The measuring pipe (10) has a pair of recesses (12) on the outer side at the axially central part. The two recesses (12) are symmetrically located across the axis of the pipe (10), and the bottom surfaces of the recesses (12) are in a single cylindrical surface coaxial with the pipe (10). A flange (14) is formed at each axial end of the pipe (10).

A pair of electrodes (16) are positioned across the pipe (10) on a straight line at right angles to the axis of the pipe (10) and to the line connecting the centers of the two recesses (12). The electrodes (16) are electrically insulated from the pipe (10).

An insulating lining (18) is provided over the entire inner surface of the measuring pipe (10) except at the tips of the electrodes (16). Both ends of the lining (18) are flared to overlap the end faces of the pipe (10).

Upper casing unit (20) and lower casing unit (22) are made of magnetic material and are semi-cylindrically shaped to cover the side of the measuring pipe (10). The casing units (20) and (22) meet together at a horizontal plane that includes the axis of the pipe (10), and they are welded to each other at horizontal side lines (23). The casing units (20) and (22) have hollow extensions (24), in which magnetic flux generating units (28) are contained.

Each of the magnetic flux generating units (28) consists of a magnet core (32) and a coil (36) wound around the core (32). The magnet cores (32) are secured to the inner surfaces of the hollow extensions (24) of the casing units (20) and (22), with bolts (40). Coil supporting plates (41) of magnetic material are inserted between the coils (36) and the hollow extensions (24). The magnet cores (32) are arranged in a straight line across the pipe (10) at right angles to the axis of the pipe (10) and to the line connecting the electrodes (16). And the magnet cores (32) are provided with flanges (42) which face toward the recesses (12) of the measuring pipe (10) and form small gaps (44) between themselves and the bottom surfaces of the recesses (12).

The bolts (40) penetrate holes (46) in the hollow extensions (24) of the casing units (20) and (22), and they are screwed in threaded blind holes (48) in the magnet cores (32). The holes (46) in the hollow extensions (24) are large enough so that the location of the magnetic cores (32) in relation to the casing units (20) and (22) is adjustable.

Figure 4:
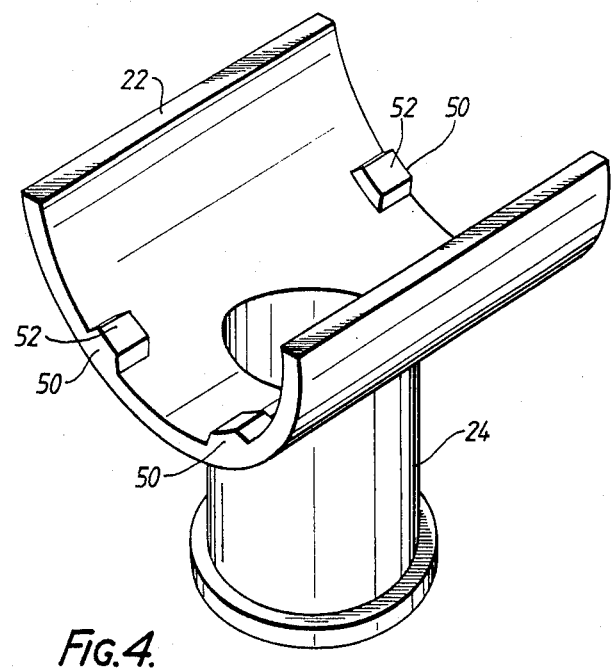
FIG. 4 is a detailed perspective view of the lower casing unit according to the invention.

The lower casing unit (22) has two projections (50) near each end in the semi-cylindrical inner surface abutting against the measuring pipe (10), as better shown in FIG. 4. The four projections (50) have equal heights and are arranged symmetrically. The inner surfaces (52) of the projections (50) are curved to fit with the outer surface of the pipe (10). The inner surfaces (52) of the projections (50) are finished mechanically so that the axis of the casing units (20) and (22) and the axis of the pipe (10) are aligned. Therefore, the gap (54) between the upper casing unit (20) and the pipe (10), and the gap (56) between the lower casing unit (22) and the pipe (10) are equal.

Electric leads (not shown) connected to the electrodes (16) and the coils (36) penetrate a hole (not shown) in the hollow extension (24) in the upper casing unit (20).

Figure 5:
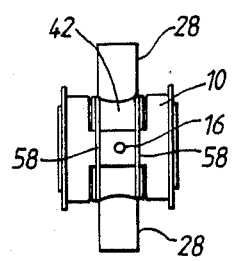
FIG. 5 is an elevational view of the measuring pipe and the magnetic flux generating units combined with the elastic belts under construction.

The process for constructing the electromagnetic flow meter is described below:

The two magnetic flux generating units (28) are abutted to the recesses (12) in the measuring pipe (10) with the electrodes (16), and they are temporarily bound with two elastic belts (58) set on the flanges (42) of the magnet cores (32), as shown in FIG. 5. Since the belts (58) are elastic, the flux generating units (28) are easily adjusted to sit at the right positions.

Subsequently, the measuring pipe (10) provided with the electrodes (16) and the flux generating units (28) is put on the lower casing unit (22), and then the upper casing unit (20) is put on them. Since the projections (50) on the lower casing unit (22) are accurately finished, the axes of the pipe (10) and the casings (20) and (22) coincide.

The electric leads connected to the electrodes (16) and the coils (36) are drawn out through a hole in the upper casing unit (20).

Then the bolts (40) are screwed through the holes (46) in the hollow extensions (24) of the casing units (20) and (22) into the threaded holes (48) in the magnet cores (32). Since the belts (58) are elastic, the magnetic cores (32) are drawn off the pipe (10) toward the casing units (20) and (22) as the bolts (40) are screwed in. The belt (40) on the lower casing unit (22) should be screwed in before the bolt (40) on the upper casing unit (20) is screwed in, so that the measuring pipe (10) will not be suspended on the belts (58). The holes (46) in the hollow extensions (2)) are large enough so that the magnet cores (32) are positioned at the right place regardless of inaccuracy in the positions of the centers of the holes (46).

Then the upper and lower casing units (20) and (22) at the horizontal side lines (23), and the ends of the casing units (20) and (22) and flanges (14) of the measuring pipe (10) are, respectively, welded.

The electromagnetic flow meter described above is mounted between respective flanges of upstream and downstream portions of piping (not shown) that conveys the fluid to be measured. The flow meter is tightly clamped by tightening mounting bolts (not shown) that connect together the flanges (not shown) of the piping outside the hollow extensions (24) of the casing units (20) and (22). When the coils (36) are supplied with an exciting current, the magnetic flux generating units (28) generate magnetic field lines that extend orthogonally to both the imaginary line connecting the pair of electrodes (16) and the axis of the measuring pipe (10). An electromotive force is produced when the fluid conveyed by the piping flows through the flow meter and cuts the magnetic field lines. The electromotive force, which is proportional to the flow velocity, is delivered by the electrodes (16) and lead wires (not shown) to a converter (not shown) where it is converted into a flow rate measurement.

In the embodiment described above, it is easy to make the axes of the measuring pipe (10) and the casing units (20) and (22) coincide, and it is easy It is also easy to draw the electric leads connected positions to the electrodes (16) and the coils (36) out of the casing units (20) and (22). Furthermore, the magnetic field generated in the measuring pipe (10) is stronger, since the magnet cores (32) are in direct contact with the casing units (20) and (22) of magnetic metal.

Figure 6:
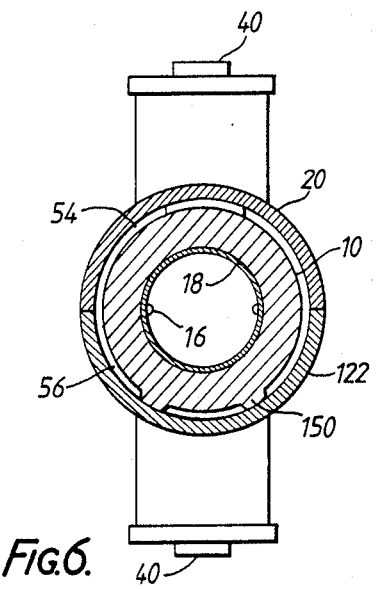
FIG. 6 is a cross-sectional view of another embodiment of the flow meter of the present invention, taken similarly as in FIG. 2.

In another embodiment shown in FIG. 6, a measuring pipe (10) has projections (150) on its outer surface abutting against the inner surface of a lower casing unit (122). The lower casing unit (122) does not have projections abutting against the measuring pipe (110). The other features are the same as in the first embodiment, and the same advantages can be obtained.

The foregoing description has been set forth merely to illustrate preferred embodiments of the invention and is not intended to be limiting. Since modification of the described embodiments incorporating the spirit and substance of the invention may occur to persons skilled in the art, the scope of the invention should be limited solely with respect to the appended claims and equivalents.

What is claimed is:

1. An electromagnetic flow meter interposable between ends of upstream and downstream pipes conveying a fluid whose flow rate is to be measured, said flow meter comprising:
   a measuring pipe made of non-magnetic material, said fluid flowing through said measuring pipe along the axis of said measuring pipe;
   a pair of electrodes for picking up electricity generated depending on the flow rate of the fluid in said measuring pipe, said electrodes mounted in said measuring pipe;
   first and second magnetic flux generating units for generating magnetic flux in said measuring pipe, said flux generating units being arranged facing toward and being separated by gaps from the outer surface of said measuring pipe;
   a first casing unit enclosing said first magnetic flux generating unit and a first circumferential portion of said measuring pipe, said first magnetic flux generating unit being adjustably secured to said first casing unit;
   means, including a plurality of spacing members associated with at least one of said measuring pipe and said first casing unit, for positioning said first casing unit in spaced relationship with respect to said measuring pipe; and
   a second casing unit enclosing said second magnetic flux generating unit and a second circumferential portion of said measuring pipe, said first and second circumferential portions representing the entire circumference of said measuring pipe, said second magnetic flux generating unit being adjustably secured to said second casing unit, and said second casing unit facing toward said measuring pipe and forming a gap therebetween.

2. A flow meter according to claim 1, wherein said spacing members are radially inward projections formed on an inner surface or said first casing unit, said inward projections abutting against said measuring pipe.

3. A flow meter according to claim 1, wherein said spacing members are radially outward projections formed on an outer surface of said measuring pipe, said outward projections abutting against said first casing unit.

4. A flow meter according to claim 1 wherein said first and second casing units are fastened to each other at a plane which contains the axis of said measuring pipe.

5. A flow meter according to claim 1, further comprising screws for securing said magnetic flux generating unit to said casing units.

6. A flow meter according to claim 1, wherein at least part of said casing units comprises a magnetic material.

7. A flow meter according to claim 1, wherein:
   said electrodes are positioned on a straight line orthogonal to the axis of said measuring pipe; and
   each of said flux generating units has an axis positioned on a straight line that intersects at right angles to a line connecting said electrodes and to the axis of said measuring pipe at a common point of intersection.

8. A flow meter according to claim 1, further comprising an elastic member for urging said magnetic flux generating units toward said measuring pipe.

* * * * *